(12) United States Patent
Lin et al.

(10) Patent No.: US 11,553,549 B2
(45) Date of Patent: Jan. 10, 2023

(54) MULTI-ACCESS PDU SESSION STATE SYNCHRONIZATION BETWEEN UE AND NETWORK

(71) Applicant: MEDIATEK INC., Hsin-Chu (TW)

(72) Inventors: Yuan-Chieh Lin, Hsin-Chu (TW); Chien-Chun Huang-Fu, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 15 days.

(21) Appl. No.: 17/368,820

(22) Filed: Jul. 6, 2021

(65) Prior Publication Data
US 2022/0046742 A1 Feb. 10, 2022

Related U.S. Application Data

(60) Provisional application No. 63/063,442, filed on Aug. 10, 2020, provisional application No. 63/062,560, filed on Aug. 7, 2020.

(51) Int. Cl.
*H04W 76/25* (2018.01)
*H04W 60/00* (2009.01)
(Continued)

(52) U.S. Cl.
CPC ......... *H04W 76/25* (2018.02); *H04W 56/001* (2013.01); *H04W 60/00* (2013.01);
(Continued)

(58) Field of Classification Search
CPC ... H04W 76/25; H04W 56/001; H04W 60/00; H04W 76/10; H04W 76/30; H04W 80/02; H04W 84/042; H04W 76/34; H04W 60/005; H04W 76/16; H04W 76/15; H04W 8/04; H04W 8/26; H04W 12/06; H04W 12/062; H04W 12/065; H04W 12/068; H04W 12/069; H04W 60/04
See application file for complete search history.

(56) References Cited

U.S. PATENT DOCUMENTS

2022/0124850 A1* 4/2022 Gundavelli ........... H04W 76/15

OTHER PUBLICATIONS

Wu, Hongjia, et al. "Multipath scheduling for 5G networks: Evaluation and outlook." IEEE Communications Magazine 59.4 (2021): 44-50. (Year: 2021).*

(Continued)

*Primary Examiner* — Sharad Rampuria
(74) *Attorney, Agent, or Firm* — Imperium Patent Works; Zheng Jin

(57) ABSTRACT

A PDU session status information element (IE) is used to bi-directionally synchronize the state of a multi-access (MA) Protocol data unit (PDU) session between UE and NW. In the downlink, the PDU session status IE is included in a 5GMM message sent from NW to UE over an access type, and it indicates the user plane resources are NOT established at NW side on the access type the 5GMM message is sent over. For MA PDU sessions having user plane resources established in the UE side only on the access type the 5GMM message is sent over, the UE performs a local release of those MA PDU sessions. For MA PDU sessions having user plane resources established in the UE side on both access types, the UE performs a local release on the user plane resources on the access type the 5GMM message is sent over.

15 Claims, 6 Drawing Sheets

(51) Int. Cl.
*H04W 76/10* (2018.01)
*H04W 56/00* (2009.01)
*H04W 76/30* (2018.01)
*H04W 80/02* (2009.01)
*H04W 84/04* (2009.01)

(52) U.S. Cl.
CPC ........... *H04W 76/10* (2018.02); *H04W 76/30* (2018.02); *H04W 80/02* (2013.01); *H04W 84/042* (2013.01)

(56) References Cited

OTHER PUBLICATIONS

Taiwan IPO, office action for the Taiwanese patent application 110125796 (no English translation is available) dated Apr. 11, 2022 (11 pages).
3GPP, "Technical Specification, 3rd Generation Partnership Project; Technical Specification Group Core Network and Terminals; Non-Access-Stratum (NAS) protocol for 5G System (5GS); Stage 3; (Release 16)", 3GPP TS 24.501 V16.5.1, dated Jul. 2020 (708 pages). Table 9.11.2.1A.1, figure 6.4.1.2.1, section 1, 5.1.3.1, 5.3.24, 5.5.1.3.4, 5.5.2.2.3, 5.6.1.1, 5.6.1.2.1, 5.6.1.2.2, 5.6.1.4.1, 5.6.1.4.2, 6.1.4.1, 6.1.4.2, 8.2.30.6.
3GPP, "Technical Specification, 3rd Generation Partnership Project; Technical Specification Group Services and System Aspects; Procedures for the 5GSystem (5GS); Stage 2 (Release 16)", 3GPP TS 23.502 V16.5.1, dated Aug. 2020 (588 pages). Sec. 4.22.6.3, 4.22.7.

\* cited by examiner

MULTI-ACCESS PDU SESSION STATE SYNCHRONIZATION BETWEEN UE AND NETWORK

CROSS REFERENCE TO RELATED APPLICATIONS

This application claims priority under 35 U.S.C. § 119 from U.S. Provisional Application No. 63/062,560, entitled "MA PDU Session State Synchronization between UE and Network", filed on Aug. 7, 2020, and 63/063,442, "Local release of an MA PDU session having user plane resources established on both 3GPP access and non-3GPP access", filed on Aug. 10, 2020, the subject matter of which is incorporated herein by reference.

TECHNICAL FIELD

The disclosed embodiments relate generally to wireless communication, and, more particularly, to method of handling of Multi-Access (MA) PDU session state synchronization between UE and network.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G Access Network (e.g., a 3GPP radio access network (RAN), or a non-3GPP RAN). The network/UE can initiate different PDU session procedures, e.g., PDU session establishment, PDU session modification, and PDU session release.

Operators are seeking ways to balance data traffic between mobile cellular networks and non-3GPP access in a way that is transparent to users and reduces mobile network congestion. In 5GS, UEs that can be simultaneously connected to both 3GPP access and non-3GPP access (using 3GPP NAS signalling), thus the 5GS is able to take advantage of these multiple accesses to improve the user experience, optimize the traffic distribution across various accesses. Accordingly, 3GPP introduced Multi-Access (MA) PDU session in 5GS. A MA PDU session uses one 3GPP access network or one non-3GPP access network at a time, or simultaneously one 3GPP access network and one non-3GPP access network. In addition, the UE and network can support Access Traffic Steering Switching and Splitting (ATSSS) functionalities to distribute traffic over 3GPP access and non-3GPP access for the established MA PDU session.

There are three possible states of an active MA PDU session. The three states includes a first state of MA PDU with 3GPP access, a second state of MA PDU with non-3GPP access, and a third state of MA PDU with both 3GPP and non-3GPP access. A PDU session status information element (IE) is used to bi-directionally synchronize the state of PDU session context between UE and network on a specific access type. Since an SA PDU session exists only on one access type, the "PDU session status IE" sent over one access type (i.e., 3GPP access or non-3GPP access) can be clearly used to indicate the active (or not-inactive)/inactive status of the corresponding PDU sessions over the access type. However, the network and UE handling upon receipt of the "PDU session status IE" for MA PDU sessions is not defined.

A solution is sought.

SUMMARY

A method of handling multi-access (MA) Protocol data unit (PDU) session state synchronization is proposed. An MA PDU session uses one 3GPP access network or one non-3GPP access network at a time, or simultaneously one 3GPP access network and one non-3GPP access network. A PDU session status information element (IE) is used to bi-directionally synchronize the state of PDU session context between UE and network on a specific access type. There are three possible states of an active MA PDU session. In the downlink, the PDU session status IE is included in a 5GMM message (e.g., REGISTRATION ACCEPT or SERVICE ACCEPT) sent from NW to UE over an access type, and it indicates the user plane resources are NOT established at the NW side on the access type the 5GMM message is sent over. For MA PDU sessions having user plane resources established in the UE side only on the access type the 5GMM message is sent over, the UE performs a local release of those MA PDU sessions. For MA PDU sessions having user plane resources established in the UE side on both access types, the UE performs a local release of the user plane resources on the access type the 5GMM message is sent over.

Similarly, in the uplink, the PDU session status IE is included in a 5GMM message (e.g., REGISTRATION REQUEST or SERVICE REQUEST) sent from UE to NW over an access type, and it indicates the user plane resources are NOT established at the UE side on the access type the 5GMM message is sent over. For MA PDU sessions having user plane resources established in the NW side only on the access type the 5GMM message is sent over, the NW (AMF) performs a local release of those MA PDU sessions, and optionally requests the SMF to perform a local release of those MA PDU sessions. For MA PDU sessions having user plane resources established in the NW side on both access types, the NW performs a local release of the user plane resources of those PDU sessions on the access type the 5GMM message is sent over, and optionally requests the SMF to perform a local release of the user plane resources of those PDU sessions on the access type the 5GMM message is sent over.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
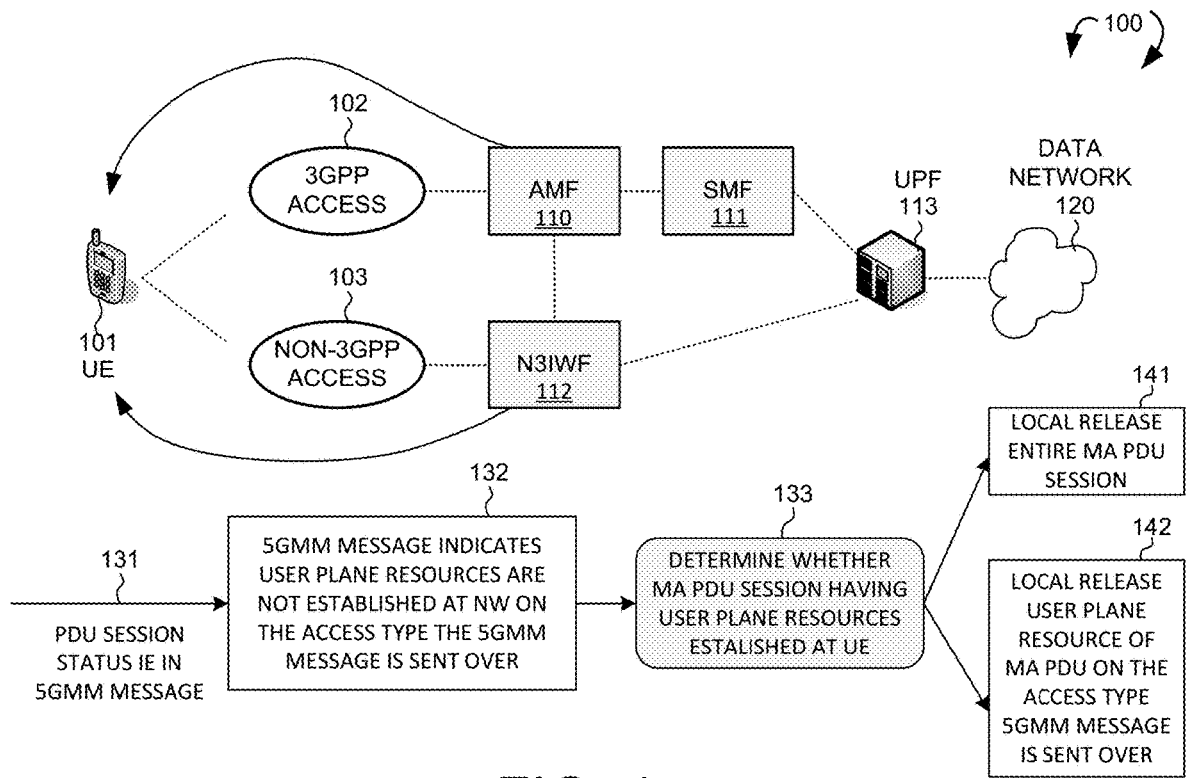
FIG. 1 illustrates an exemplary 5G network supporting Multi-Access Protocol Data Unit (MA PDU) session state synchronization between UE and network in accordance with one novel aspect.

FIG. 1 illustrates an exemplary 5G network 100 supporting Multi-Access Protocol Data Unit (MA PDU) session state synchronization between UE and network in accordance with one novel aspect. 5G network 100 comprises a user equipment UE 101, a 3GPP radio (e.g., NR) access network RAN 102, a non-3GPP radio access network RAN 103, an Access and Mobility Management Function (AMF) 110, a Session Management Function (SMF) 111, an Non-3GPP Interworking Function (N3IWF) 112, a User Plane Function (UPF) 113, and a data network 120. The AMF communicates with the base station, SMF and UPF for access and mobility management of wireless access devices in mobile communication network 100. The SMF is primarily responsible for interacting with the decoupled data plane, creating, updating and removing Protocol Data Unit (PDU) sessions and managing session context with the UPF. The N3IWF functionality interfaces to 5G core network control plane functions, responsible for routing messages outside 5G RAN.

In Access Stratum (AS) layer, RAN provides radio access for UE 101 via a radio access technology (RAT). In Non-Access Stratum (NAS) layer, AMF and SMF communicate with RAN and 5GC for access and mobility management and PDU session management of wireless access devices in 5G network 100. 3GPP Radio access network RAN 102 may include base stations (gNBs) providing radio access for UE 101 via various 3GPP RATs including 5G, 4G, and 3G/2G. Non-3GPP radio access network RAN 103 may include access points (APs) providing radio access for UE 101 via non-3GPP including WiFi. UE 101 can obtain access to data network 120 through 3GPP access 102, AMF 110, SMF 111, and UPF 113. UE 101 can obtain access to data network 120 through non-3GPP access 103, N3IWF 112, AMF 110, SMF 111, and UPF 113. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

5GS networks are packet-switched (PS) Internet Protocol (IP) networks. This means that the networks deliver all data traffic in IP packets, and provide users with Always-On IP Connectivity. When UE joins an EPS network, a Packet Data Network (PDN) address (i.e., the one that can be used on the PDN) is assigned to the UE for its connection to the PDN. In 4G, EPS has defined a Default EPS Bearer to provide the IP Connectivity that is Always-On. In 5G, a Protocol Data Unit (PDU) session establishment procedure is a parallel procedure of a PDN connection procedure in 4G. A PDU session defines the association between the UE and the data network that provides a PDU connectivity service. Each PDU session is identified by a PDU session ID (PSI), and may include multiple QoS flows and QoS rules.

Each PDU session can be established over a 3GPP RAN, or over a non-3GPP RAN for radio access. 5G Session management (5GSM) for PDU sessions over both 3GPP access and non-3GPP access are managed by AMF and SMF via NAS signaling. Operators are seeking ways to balance data traffic between mobile networks and non-3GPP access in a way that is transparent to users and reduces mobile network congestion. In 5GS, UEs that can be simultaneously connected to both 3GPP access and non-3GPP access (using 3GPP NAS signalling), thus the 5GS is able to take advantage of these multiple accesses to improve the user experience, optimize the traffic distribution across various accesses. Accordingly, 3GPP introduced Multi-Access (MA) PDU session in 5GS. A MA PDU session uses one 3GPP access network or one non-3GPP access network at a time, or simultaneously one 3GPP access network and one non-3GPP access network. In addition, the UE and the network can support Access Traffic Steering Switching and Splitting (ATSSS) functionalities to distribute traffic over 3GPP access and non-3GPP access for the established MA PDU session.

An MA PDU session is active when user plane resources of the MA PDU session are established over at least one access type. For an active MA PDU session, there are three possible states. The three states includes a first state of the MA PDU session with user plane resources established on 3GPP access, a second state of the MA PDU session with user plane resources established on non-3GPP access, and a third state of the MA PDU session with user plane resources established on both 3GPP and non-3GPP accesses. A PDU session status information element (IE) is used to bi-directionally synchronize the state of PDU session context between UE and network on a specific access type. Since a single access (SA) PDU session exists only on one access type, the PDU session status IE sent over one access type can be clearly used to indicate the active (or not-inactive) or inactive status of the corresponding PDU sessions over the access type. However, the network and UE handling upon receipt of the PDU session status IE for MA PDU sessions is not defined.

In accordance with one novel aspect, a method of handling MA PDU session state synchronization between UE and network is proposed. In the downlink, UE 101 receives a PDU session status IE included in a 5G mobility management (5GMM) message (e.g., REGISTRATION ACCEPT or SERVICE ACCEPT) sent from NW over an access type (step 131). The PDU session status IE indicates the user plane resources of a MA PDU identified by a PSI are NOT established at the NW side on the access type the 5GMM message is sent over (step 132). Next, UE 101 determines whether the MA PDU session having user plane resources established in the UE side (step 133). If the MA PDU session has user plane resources established in the UE side only on the access type the 5GMM message is sent over, then UE 101 performs a local release of the MA PDU session (step 141). Otherwise, if the MA PDU session has user plane resources established in the UE side on both access types, then UE 101 performs a local release of the user plane resources on the access type the 5GMM message is sent over (step 142). Similar steps are applicable for the uplink to synchronize the MA PDU session state.

Note that under certain abnormal cases, the MA PDU session state at the UE side and at the NW side may not be synchronized. For example, the release of a PDU session with expiry of timer T3582 may cause such abnormal case, because the (re)transmission of PDU_SESSION_RELEASE_REQUEST may not be successful, even after repetitive expiry of timer T3582. On the fifth expiry of timer T3582, the UE aborts the PDU session release procedure, releases the allocated PTI, performs a local release of the PDU session, and performs a registration procedure for mobility and periodic registration update with a REGISTRATION REQUEST message including the PDU session status IE over each access (e.g., 3GPP and non-3GPP) that user plane resources have been established if the PDU session is an MA PDU session. More specifically, in order to make sure that the MA PDU session state is synchronized between the UE and the NW, the local release of an MA PDU session involves the UE initiating the registration procedure over each access. If user plane resources were established on both access types, then the UE sends a REGISTRATION REQUEST message including the PDU session status IE over both access types. If user plane resources were established only on 3GPP access type, then the UE sends a REGISTRATION REQUEST message including the PDU session status IE only over 3GPP access type. If user plane resources were established only on non-3GPP access types, then the UE sends a REGISTRATION REQUEST message including the PDU session status IE only over non-3GPP access type.

Figure 2:
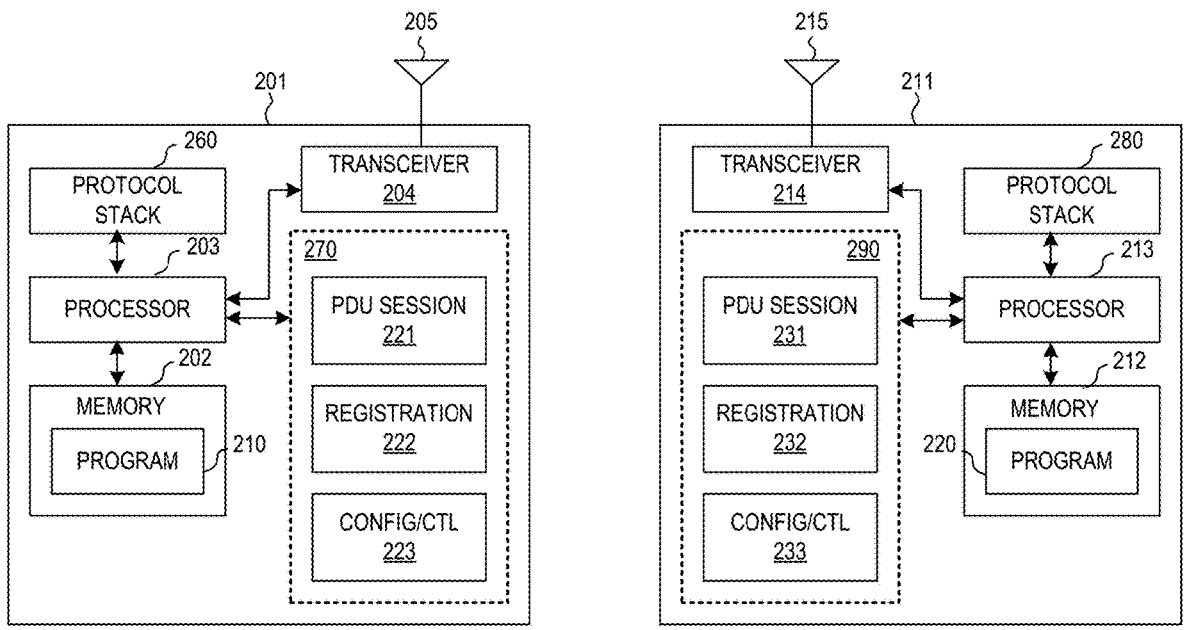
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuitry 290.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuitry to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuitry 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network.

In one example, system modules and circuits 270 comprise PDU session handling circuit 221 that performs PDU session establishment and modification procedures with the network, a registration handling circuit 222 that performs registration with the network via 3GPP or non-3GPP access, and a config and control circuit 223 that handles configuration and control parameters for mobility management and session management. In one embodiment, UE receives a PDU session status IE included in a 5GMM message from the network over a specific access type, indicating that the user plane resources of an MA PDU session are not established at the network side on that specific access type. If the MA PDU session has user plane resources established in the UE side only on the same access type the 5GMM message is sent over, then the UE performs a local release of the MA PDU session. Otherwise, if the MA PDU session has user plane resources established in the UE side on both access types, then the UE performs a local release of the user plane resources on the access type the 5GMM message is sent over.

An MA PDU session in 5GS can be established after a UE is registered to the network over both 3GPP and non-3GPP access type belonging to the same PLMN. The UE establishes a MA PDU session by initiating a PDU session establishment procedure with the network over either 3GPP or non-3GPP access type and activating the MA PDU session in a single step. The activation of the MA PDU connectivity service refers to the establishment of user-plane resources on both 3GPP access and non-3GPP access. In another embodiment, the UE is registered to the network over both 3GPP and non-3GPP access type belonging to different PLMNs. The MA PDU session is first established over one access type and then established over another access type in two separate steps. In yet another embodiment, the UE registers to the network over 3GPP access and non-3GPP access type belonging to the same PLMN and establishes the MA PDU session to the same PLMN over both 3GPP access type and non-3GPP access type in two separate steps.

Figure 3:
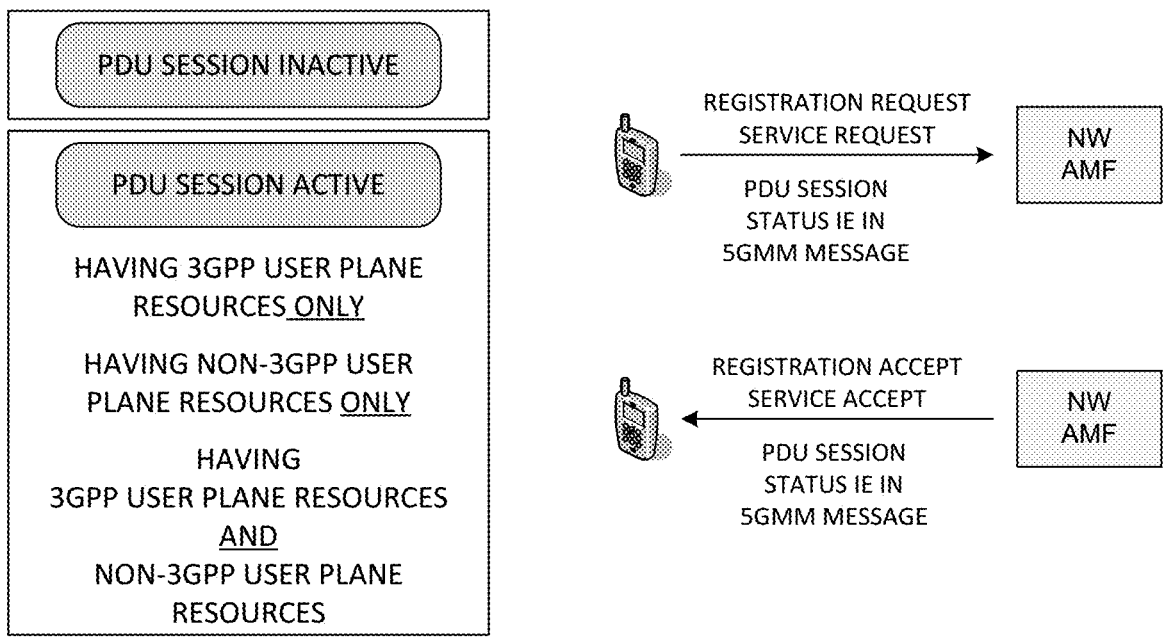
FIG. 3 shows different states of an MA PDU session and corresponding PDU session status IE used to synchronize between UE and network (NW).

FIG. 3 shows different states of an MA PDU session and corresponding PDU session status IE used to synchronize between UE and network (NW). An MA PDU session can be inactive if the user plane resources are not established over 3GPP access nor over non-3GPP access. On the other hand, there are three possible states of an active MA PDU session. The three states includes a first state of MA PDU session having only 3GPP user plane resources established, a second state of MA PDU session having only non-3GPP user plane resources established, and a third state of MA PDU session having both 3GPP and non-3GPP user plane resources established.

In FIG. 3, a PDU session status information element (IE) is used to bi-directionally synchronize the state of PDU session context between UE and network on a specific access type. The PDU session status IE carries one or more PDU session IDs (PSIs) that identifies the corresponding one or more MA PDU sessions. In the uplink, the PDU session status IE may be included in a 5GMM message (e.g., a SERVICE REQUEST message, or a REGISTRATION REQUEST message) to indicate the MA PDU session(s) not in 5GSM state PDU SESSION INACTIVE and whether user plane resources are established or not in the UE on the access the 5GMM message is sent over. In the downlink, the PDU session status IE may be included in the 5GMM message (e.g., a SERVICE ACCEPT message, or a REGISTRATION ACCEPT message) to indicate the MA PDU session(s) not in 5GSM state PDU SESSION INACTIVE and whether user plane resources are established or not in the network on the access the 5GMM message is sent over. In one example, for a specific MA PDU session (PSI=X), a bit "1" in the PDU session status IE sent over 3GPP access indicates that at the sender side the user plane resources of PSIX are established on 3GPP access, and a bit "1" in the PDU session status IE sent over non-3GPP access indicates that at the sender side the user plane resources of PSIX are established on non-3GPP access. Similarly, a bit "0" in the PDU session status IE sent over 3GPP access indicates that at the sender side the user plane resources of PSIX are not established on 3GPP access, and a bit "0" in the PDU session status IE sent over non-3GPP access indicates that at the sender side the user plane resources of PSIX are not established on non-3GPP access.

Figure 4:
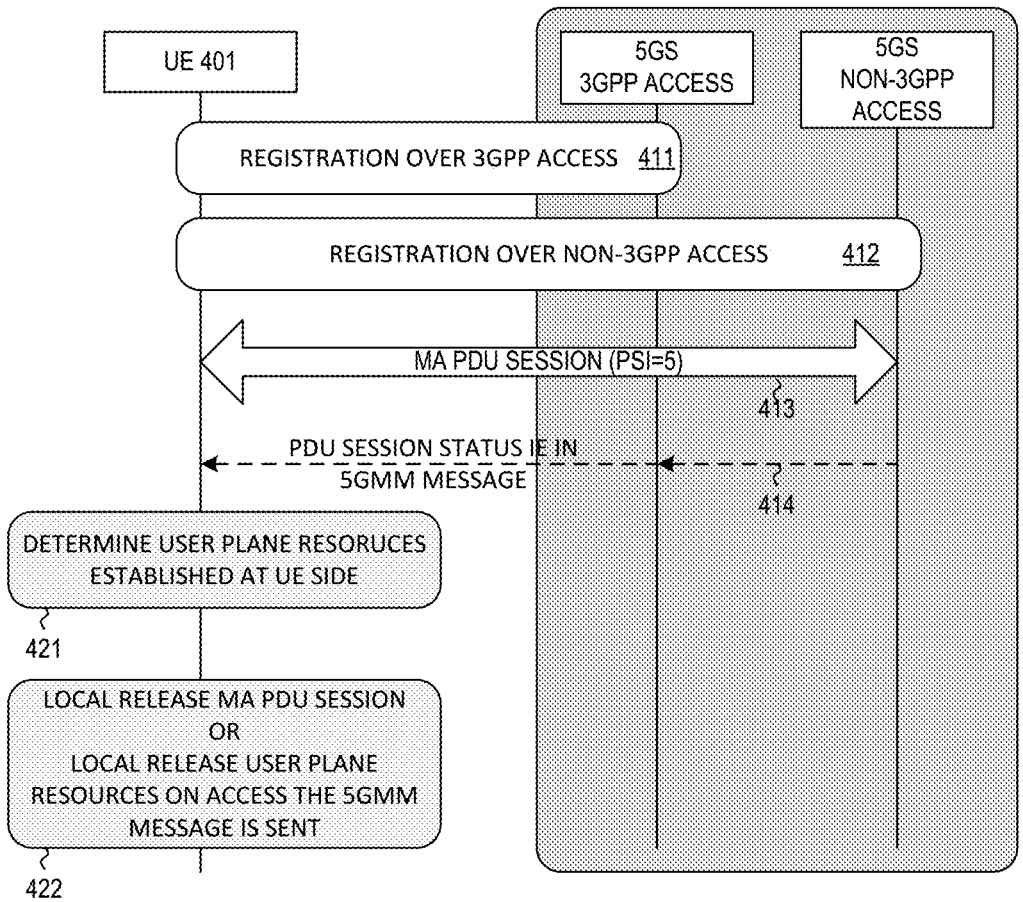
FIG. 4 is a sequence chart between UE and network for synchronizing MA PDU session state using a PDU session status IE.

FIG. 4 is a sequence chart between UE and network for synchronizing MA PDU session state using a PDU session status IE. In step 411, UE 401 registers with the 5GS network over 3GPP access type. For example, upon sending a registration request, UE 401 receives a registration accept message from AMF of the 5GS network. In step 412, UE 401 registers with the 5GS network over non-3GPP access type. For example, upon sending a registration request, UE 401 receives a registration accept message from AMF of the 5GS network. In step 413, UE 401 establishes an MA PDU with PSI=5 with the 5GS network over both 3GPP and non-3GPP access. Later on, the MA PDU session state might have changed, at UE side or at the network side, due to various usage scenarios. In order to sync between the UE and the network, a PDU session status IE can be used, in a SERVICE REQUEST/ACCEPT, or in a REGISTRATION REQUEST/ACCEPT 5GMM message. In the example of FIG. 4, in step 414, UE 401 receives a 5GMM message containing a PDU session status IE for PSI=5 from the network, via 3GPP access, or via non-3GPP access. The PDU session status IE indicates that the user plane resources for PSI=5 are not established on the access type that the 5GMM message is sent over. In step 421, UE 401 determines whether the user plane resources for PSI=5 are established at the UE side. In step 422, UE local releases the MA PDU session of PSI=5 if the user plane resources are only established on the access type that the 5GMM message is sent over. Otherwise, UE 401 local releases the user plane resources for PSI=5 if the user plane resources are established over both 3GPP and non-3GPP access types. Local release means that the UE does not inform the network or does not send a request to the network about such release.

Figure 5:
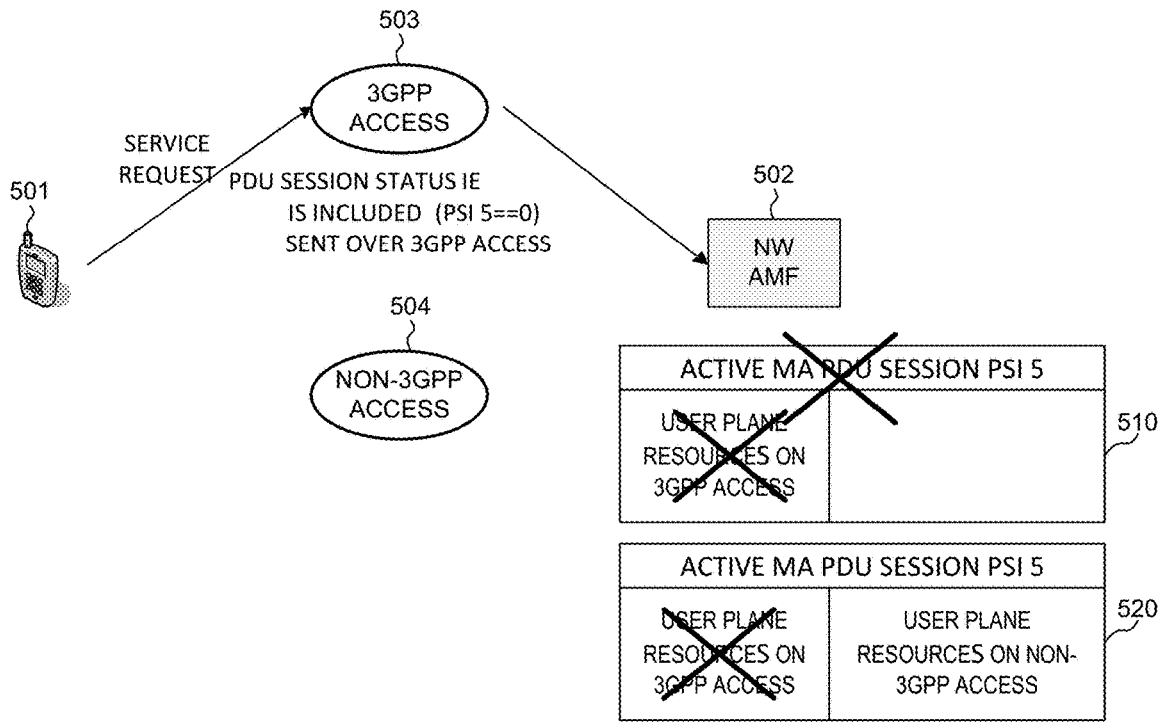
FIG. 5 illustrates a first embodiment of synchronizing MA PDU session state in the uplink when a PDU session status IE is transmitted over 3GPP access.

FIG. 5 illustrates a first embodiment of synchronizing MA PDU session state in the uplink when a PDU session status IE is transmitted over 3GPP access. In the uplink, UE can synchronize the MA PDU session state for MA PDU session with PSI=5 (PSI5) by sending a 5GMM message, e.g., a SERVICE REQUEST, to the network (NW/AMF). In the example of FIG. 5, a PDU session status IE (PSI5==0) is included in the SERVICE REQUEST, and is sent from UE 501 to NW 502 over the 3GPP access 503, indicating that the 3GPP user plane resources for MA PDU session PSI5 are not established at the UE side. Upon receiving the 5GMM message over the 3GPP access, the network checks the state of the active MA PDU session PSI5 at the NW side. In a first scenario, the user plane resources for MA PDU session PSI5 are established only on the 3GPP access, as depicted by 510. In order to sync with the UE side, the MA PDU session PSI5 at the NW side should be released as well. In a second scenario, the user plane resources for MA PDU session PSI5 are established on both 3GPP access and non-3GPP access, as depicted by 520. In order to sync with the UE side, the 3GPP user plane resources for MA PDU session PSI5 at the NW side are released.

Figure 6:
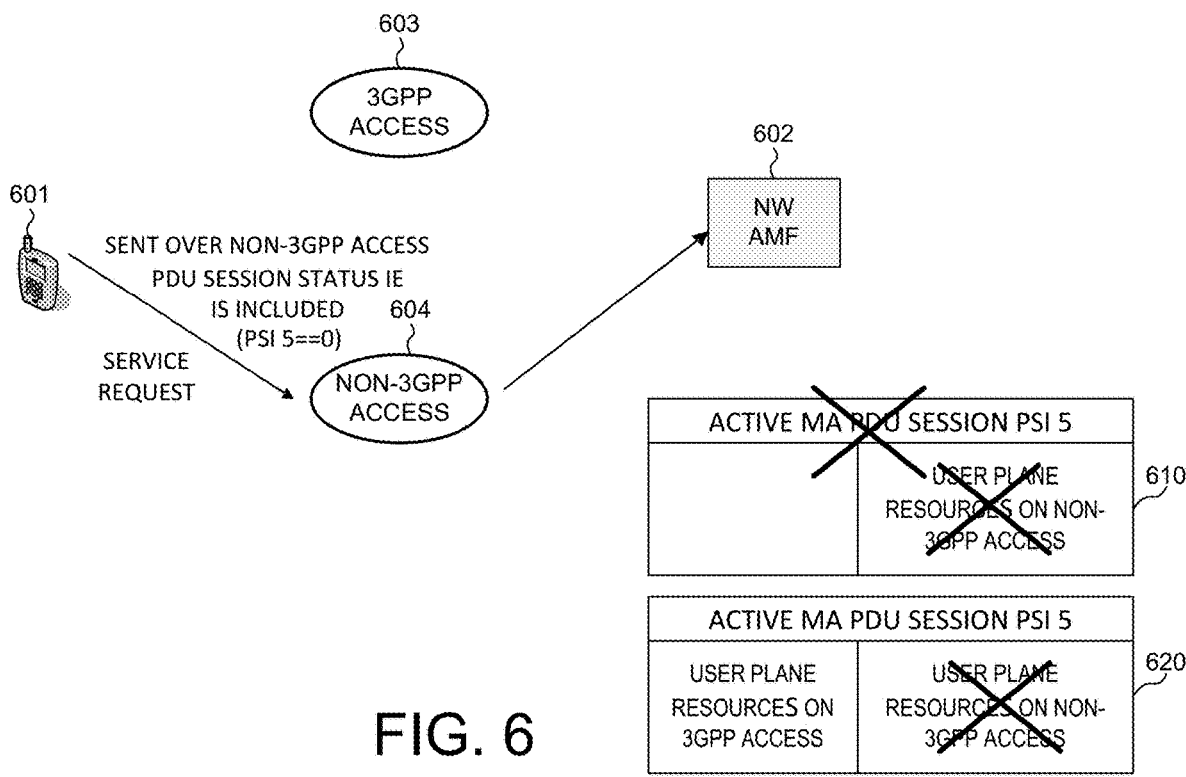
FIG. 6 illustrates a second embodiment of synchronizing MA PDU session state in the uplink when a PDU session status IE is transmitted over non-3GPP access.

FIG. 6 illustrates a second embodiment of synchronizing MA PDU session state in the uplink when a PDU session status IE is transmitted over non-3GPP access. In the example of FIG. 6, a PDU session status IE (PSI5==0) is included in the SERVICE REQUEST, and is sent from UE 601 to NW 602 over the non-3GPP access 604, indicating that the non-3GPP user plane resources for MA PDU session PSI5 are not established at the UE side. Upon receiving the 5GMM message over the non-3GPP access, the network checks the state of the active MA PDU session PSI5 at the NW side. In a first scenario, the user plane resources for MA PDU session PSI5 are established only on the non-3GPP access, as depicted by 610. In order to sync with the UE side, the network local releases the MA PDU session PSI5. In a second scenario, the user plane resources for MA PDU session PSI5 are established on both 3GPP access and non-3GPP access, as depicted by 620. In order to sync with the UE side, the non-3GPP user plane resources for MA PDU session PSI5 at the NW side are released.

Figure 7:
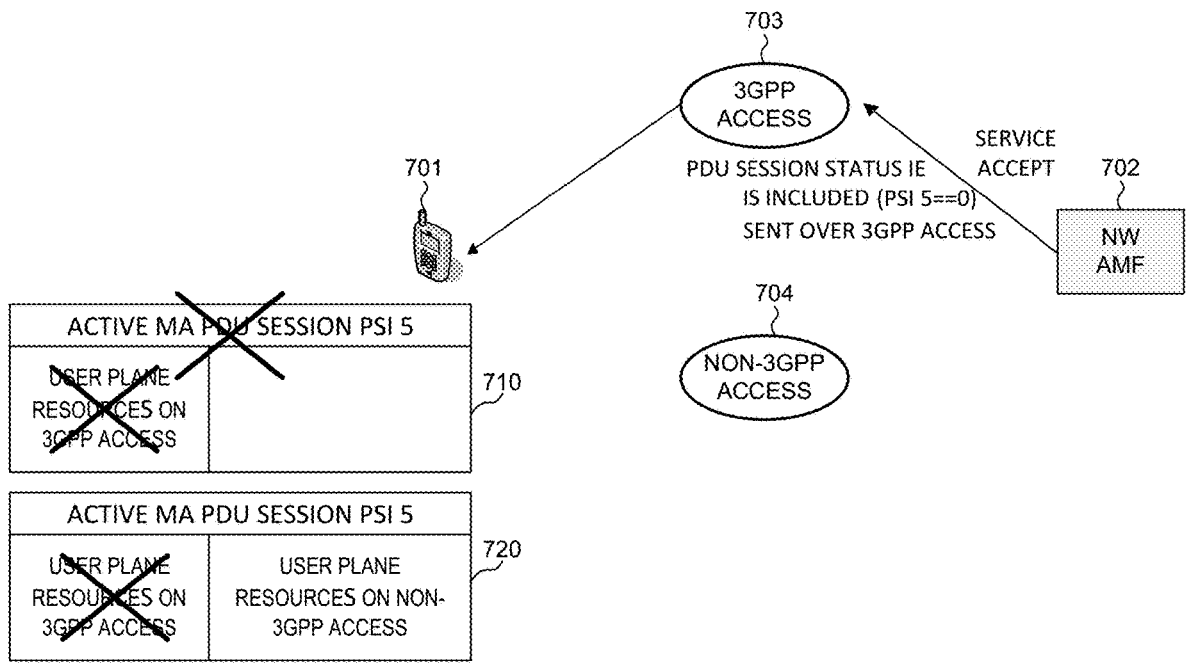
FIG. 7 illustrates a third embodiment of synchronizing MA PDU session state in the downlink when a PDU session status IE is transmitted over 3GPP access.

FIG. 7 illustrates a third embodiment of synchronizing MA PDU session state in the downlink when a PDU session status IE is transmitted over 3GPP access. In the downlink, NW can synchronize the MA PDU session state for MA PDU session with PSI=5 (PSI5) by sending a 5GMM message, e.g., a SERVICE ACCEPT, to the UE. In the example of FIG. 7, a PDU session status IE (PSI5==0) is included in the SERVICE ACCEPT, and is sent from NW/AMF 702 to UE 701 over the 3GPP access 703, indicating that the 3GPP user plane resources for MA PDU session PSI5 are not established at the NW side. Upon receiving the 5GMM message over the 3GPP access, UE 701 checks the state of the active MA PDU session PSI5 at the UE side. In a first scenario, the user plane resources for MA PDU session PSI5 are established only on the 3GPP access, as depicted by 710. The UE local releases the MA PDU session PSI5. In a second scenario, the user plane resources for MA PDU session PSI5 are established on both 3GPP access and non-3GPP access, as depicted by 720. In order to sync with the network side, the 3GPP user plane resources for MA PDU session PSI5 at the UE side are released.

Figure 8:
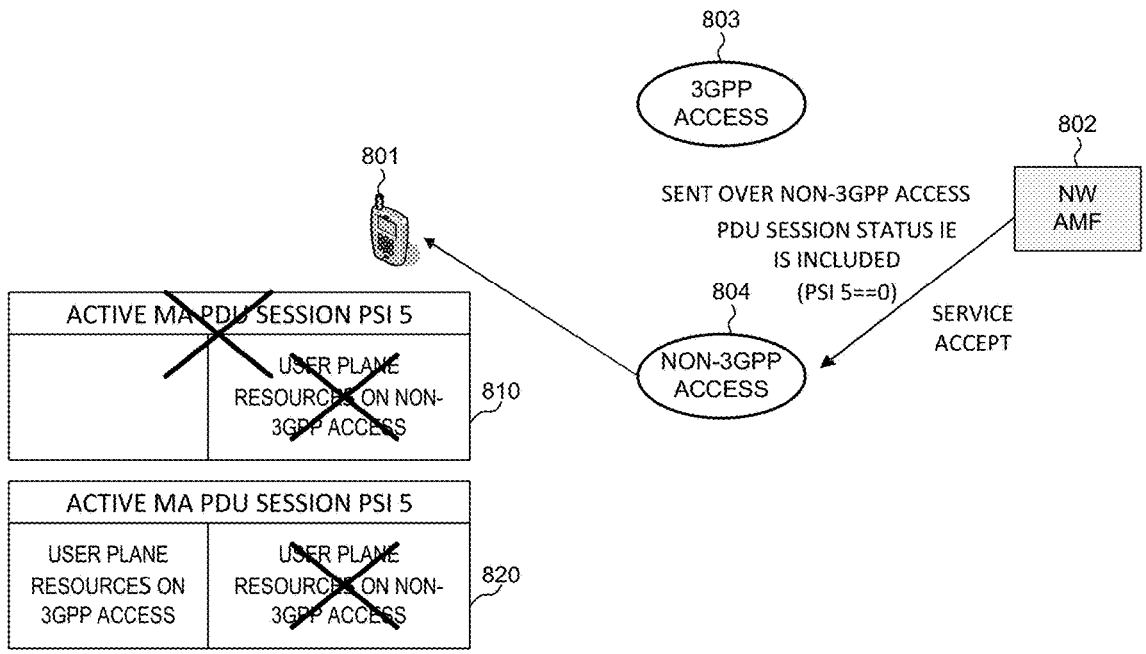
FIG. 8 illustrates a fourth embodiment of synchronizing MA PDU session state in the downlink when a PDU session status IE is transmitted over non-3GPP access.

FIG. 8 illustrates a first embodiment of synchronizing MA PDU session state in the downlink when a PDU session status IE is transmitted over non-3GPP access. In the example of FIG. 8, a PDU session status IE (PSI5=0) is included in the SERVICE ACCEPT, and is sent from NW/AMF 802 to UE 801 over the non-3GPP access 804, indicating that the non-3GPP user plane resources for MA PDU session PSI5 are not established at the NW side. Upon receiving the 5GMM message over the non-3GPP access, UE 801 checks the state of the active MA PDU session PSI5 at the UE side. In a first scenario, the user plane resources for MA PDU session PSI5 are established only on the non-3GPP access, as depicted by 810. In order to sync with the network side, the UE local releases the MA PDU session PSI5. In a second scenario, the user plane resources for MA PDU session PSI5 are established on both 3GPP access and non-3GPP access, as depicted by 820. In order to sync with the network side, the non-3GPP user plane resources for MA PDU session PSI5 at the UE side are released.

Figure 9:
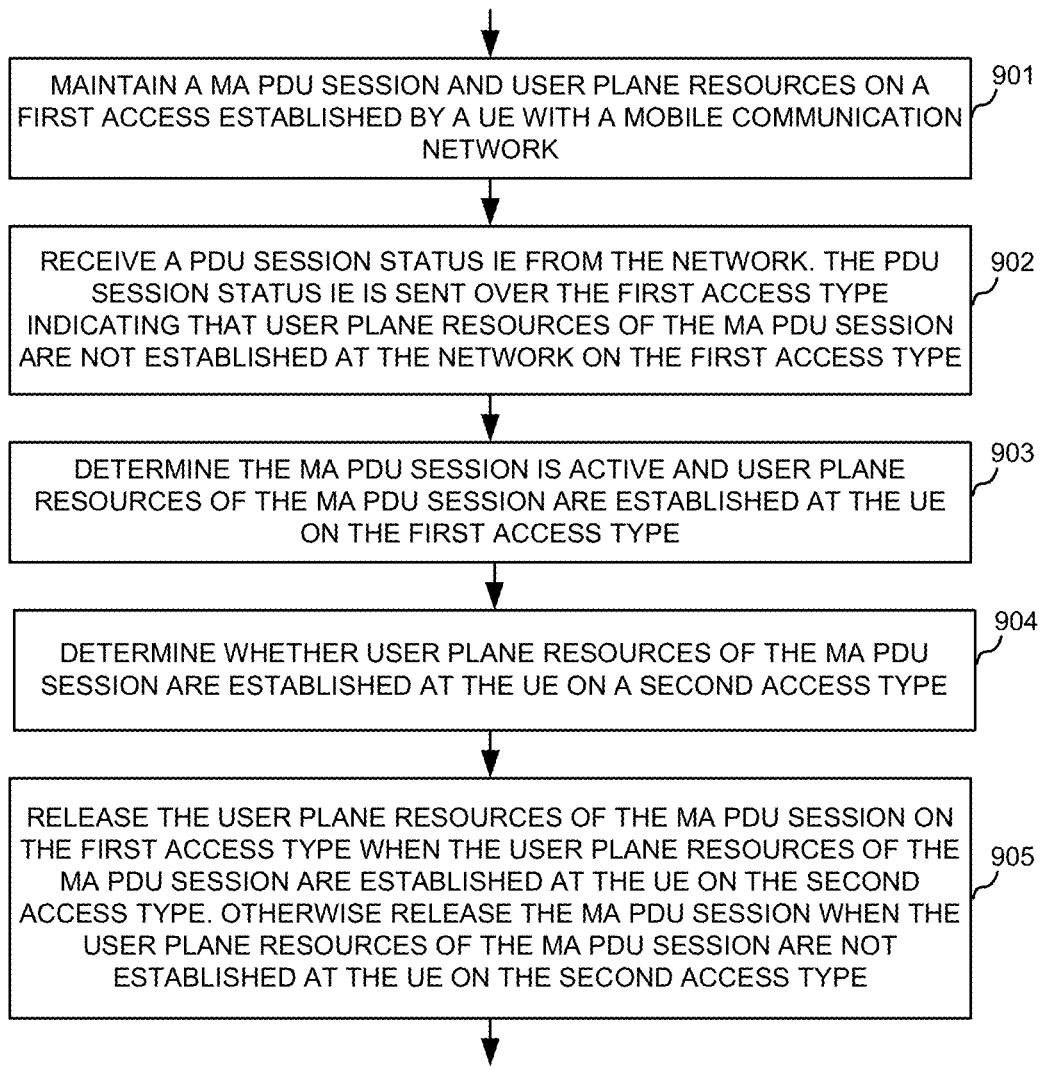
FIG. 9 is a flow chart of a method of handling multi-access (MA) Protocol data unit (PDU) session state synchronization from UE perspective in accordance with one novel aspect.

FIG. 9 is a flow chart of a method of handling multi-access (MA) Protocol data unit (PDU) session state synchronization from UE perspective in accordance with one novel aspect. In step 901, a UE maintains a multi-access protocol data unit (MA PDU) session and user plane resources on a first access type established by the UE with a mobile communication network. In step 902, the UE receives a PDU session status information element (IE) from the network. The PDU session status IE is sent over the first access type indicating that user plane resources of the MA PDU session are not established at the network side on the first access type. In step 903, the UE determines the MA PDU session is active and user plane resources of the MA PDU session are established at the UE on the first access type. In step 904, the UE determines whether user plane resources of the MA PDU session are established at the UE on a second access type. In step 905, the UE releases the user plane resources of the MA PDU session on the first access type when the user plane resources of the MA PDU session are established at the UE on the second access type. Otherwise the UE releases the MA PDU session when the user plane resources of the MA PDU session are not established at the UE on the second access type.

Figure 10:
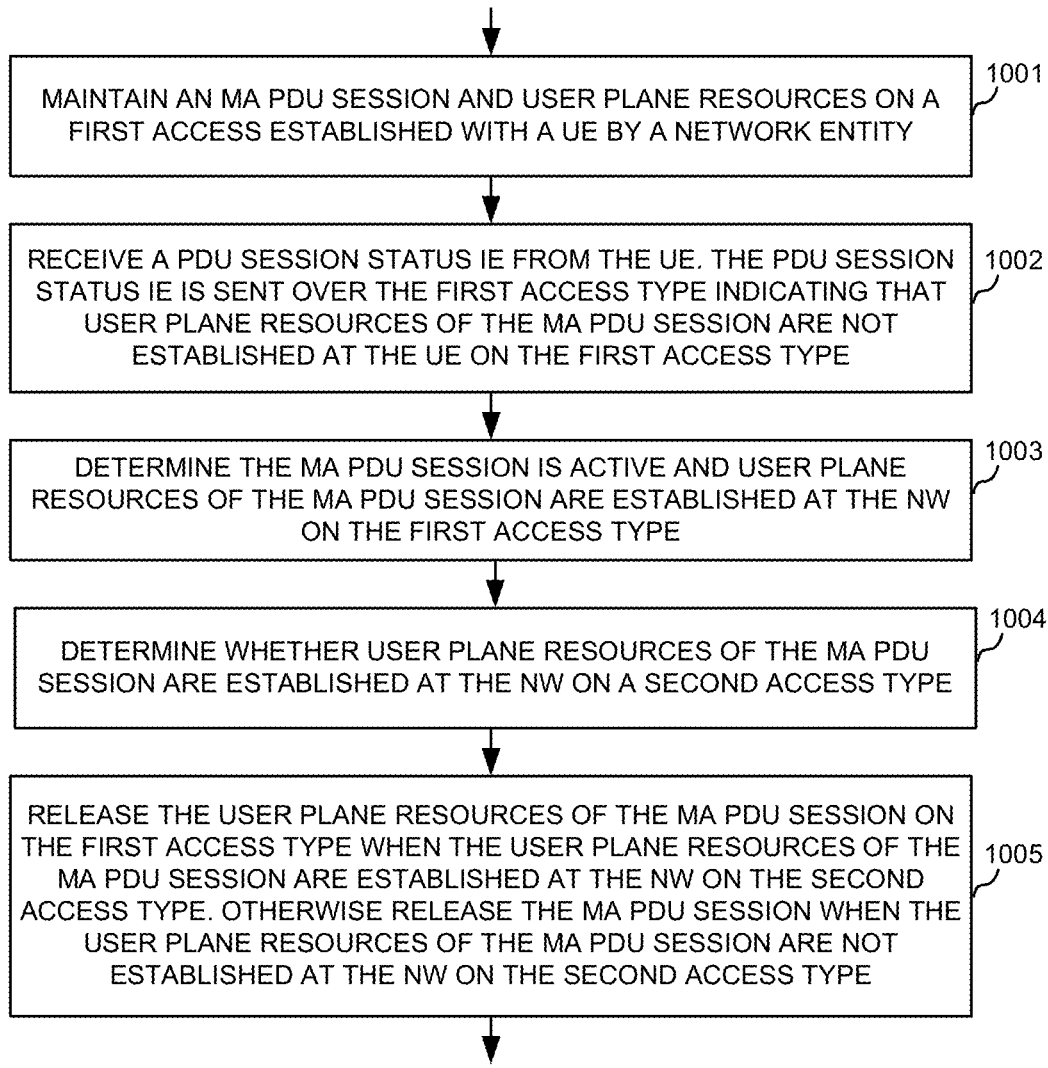
FIG. 10 is a flow chart of a method of handling multi-access (MA) Protocol data unit (PDU) session state synchronization from NW perspective in accordance with one novel aspect.

FIG. 10 is a flow chart of a method of handling multi-access (MA) Protocol data unit (PDU) session state synchronization from NW perspective in accordance with one novel aspect. In step 1001, a network entity maintains a multi-access protocol data unit (MA PDU) session and user plane resources on a first access type established with a user equipment (UE). In step 1002, the network entity receives a PDU session status information element (IE) from the UE. The PDU session status IE is sent over the first access type indicating that user plane resources of the MA PDU session are not established at the UE on the first access type. In step 1003, the network entity determines the MA PDU session is active and user plane resources of the MA PDU session are established at the network on the first access type. In step 1004, the network entity determines whether user plane resources of the MA PDU session are established at the network on a second access type. In step 1005, the network entity releases the user plane resources of the MA PDU session on the first access type when the user plane resources of the MA PDU session are established at the network on the second access type. Otherwise the network entity releases the MA PDU session when the user plane resources of the MA PDU session are not established at the network on the second access type.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   maintaining a multi-access protocol data unit (MA PDU) session and user plane resources on a first access type established by a user equipment (UE) with a mobile communication network;
   receiving a PDU session status information element (IE) from the network, wherein the PDU session status IE is sent over the first access type indicating that user plane resources of the MA PDU session are not established at the network on the first access type,
   wherein the PDU session status IE comprises PDU session identity (PSI) information that identifies the MA PDU session and further indicates whether the user plane resources of the MA PDU session are established on the first access type;
   determining the MA PDU session is active and user plane resources of the MA PDU session are established at the UE on the first access type;
   determining whether user plane resources of the MA PDU session are established at the UE on a second access type; and
   releasing the user plane resources of the MA PDU session on the first access type when the user plane resources of the MA PDU session are established at the UE on the second access type, otherwise releasing the MA PDU session when the user plane resources of the MA PDU session are not established at the UE on the second access type.

2. The method of claim 1, wherein the first access type is 3GPP and the second access type is non-3GPP access.

3. The method of claim 1, wherein the first access type is non-3GPP and the second access type is 3GPP access.

4. The method of claim 1, wherein the MA PDU session status IE is contained in a 5G mobility management (5GMM) message SERVICE ACCEPT.

5. The method of claim 1, wherein the MA PDU session status IE is contained in a 5G mobility management (5GMM) message REGISTRATION ACCEPT.

6. A User Equipment (UE), comprising:
   a protocol data unit (PDU) session handling circuit that maintains a multi-access PDU (MA PDU) session and user plane resources on a first access type established with a mobile communication network;
   a receiver that receives a PDU session status information element (IE) from the network, wherein the PDU session status IE is sent over the first access type indicating that user plane resources of the MA PDU session are not established at the network on the first access type, wherein the PDU session status IE comprises PDU session identity (PSI) information that identifies the MA PDU session and further indicates whether the user plane resources of the MA PDU session are established on the first access type;

a control circuitry configured to determine that the MA PDU session is active and user plane resources of the MA PDU session are established at the UE on the first access type, and also determines whether user plane resources of the MA PDU session are established at the UE on a second access type; and the PDU session handling circuit that releases the user plane resources of the MA PDU session on the first access type when the user plane resources of the MA PDU session are established at the UE on the second access type, otherwise releases the MA PDU session when the user plane resources of the MA PDU session are not established at the UE on the second access type.

7. The UE of claim 6, wherein the first access type is 3GPP and the second access type is non-3GPP access.

8. The UE of claim 6, wherein the first access type is non-3GPP and the second access type is 3GPP access.

9. The UE of claim 6, wherein the MA PDU session status IE is contained in a 5G mobility management (5GMM) message SERVICE ACCEPT.

10. The UE of claim 6, wherein the MA PDU session status IE is contained in a 5G mobility management (5GMM) message REGISTRATION ACCEPT.

11. A method, comprising:
maintaining a multi-access protocol data unit (MA PDU) session and user plane resources on a first access type established with a user equipment (UE) by a network entity;

receiving a PDU session status information element (IE) from the UE, wherein the PDU session status IE sent over the first access type indicates that user plane resources of the MA PDU session are not established at the UE on the first access type, wherein the PDU session status IE comprises PDU session identity (PSI) information that identifies the MA PDU session and further indicates whether the user plane resources of the MA PDU session are established on the first access type;

determining the MA PDU session is active and user plane resources of the MA PDU session are established at the network on the first access type;

determining whether user plane resources of the MA PDU session are established at the network on a second access type; and releasing the user plane resources of the MA PDU session on the first access type when the user plane resources of the MA PDU session are established at the network on the second access type, otherwise releasing the MA PDU session when the user plane resources of the MA PDU session are not established at the network on the second access type.

12. The method of claim 11, wherein the first access type is 3GPP and the second access type is non-3GPP access.

13. The method of claim 11, wherein the first access type is non-3GPP and the second access type is 3GPP access.

14. The method of claim 11, wherein the MA PDU session status IE is contained in a 5G mobility management (5GMM) message SERVICE REQUEST.

15. The method of claim 11, wherein the MA PDU session status IE is contained in a 5G mobility management (5GMM) message REGISTRATION REQUEST.

* * * * *